May 20, 1952     E. F. MacNICHOL, JR     2,597,353
SWEEP AND RANGE CIRCUIT
Filed March 22, 1945
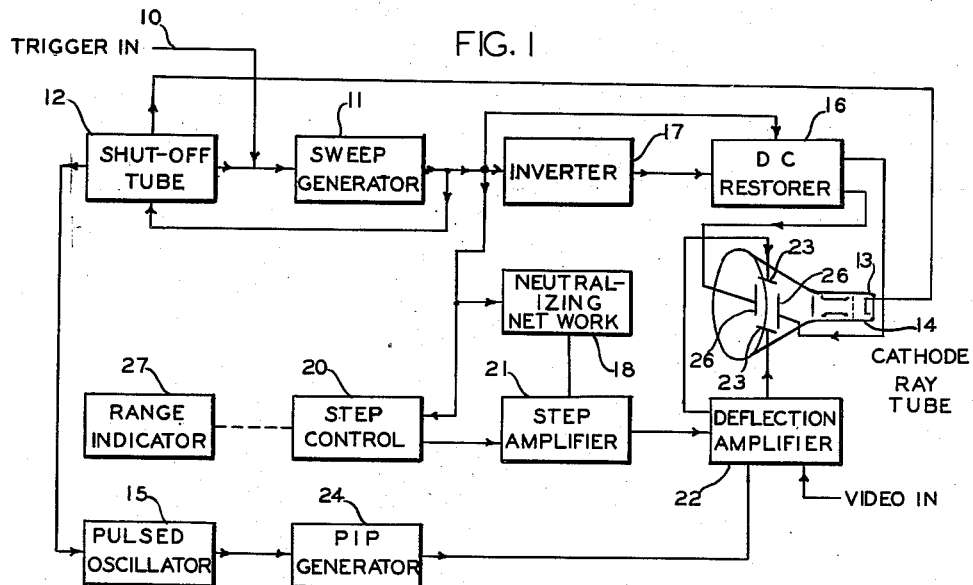
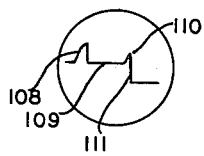
FIG. 1a
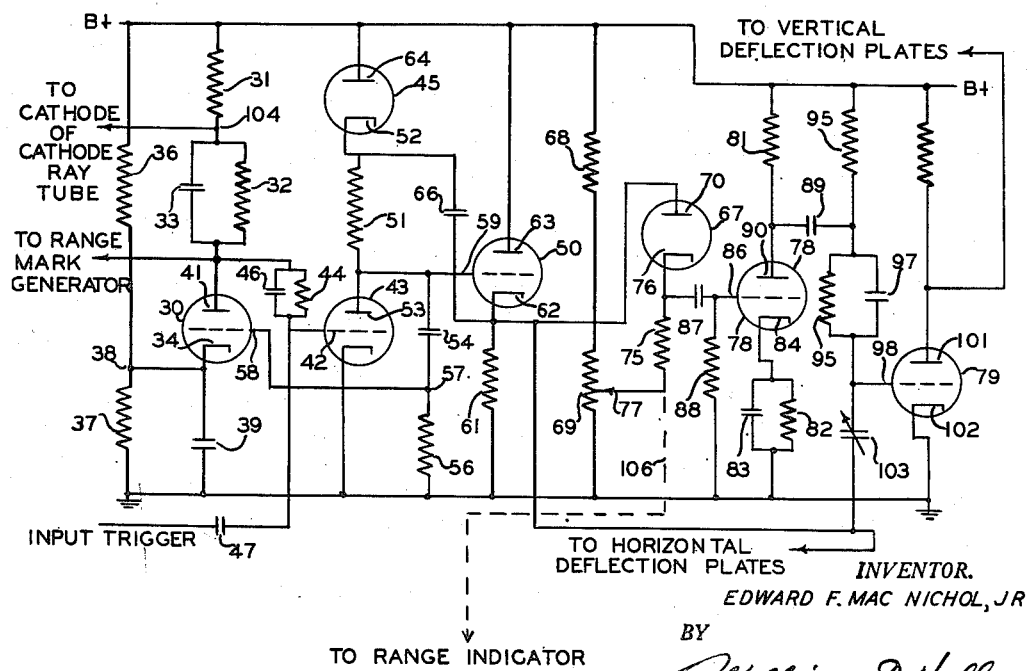
INVENTOR.
EDWARD F. MAC NICHOL, JR.
BY
William D. Hall,
ATTORNEY Patented May 20, 1952

2,597,353

UNITED STATES PATENT OFFICE 2,597,353

SWEEP AND RANGE CIRCUIT

Edward F. MacNichol, Jr., Wenham, Mass., assignor, by mesne assignments, to the United States of America as represented by the Secretary of War Application March 22, 1945, Serial No. 584,230

4 Claims. (Cl. 250—27)

The invention in general relates to electrical circuits and more particularly to radio circuits.

Radio circuits have been developed that will measure the distance to a target by measuring the time that elapses between the time a pulse is transmitted from the radio set and the time that a portion of the energy reflected from a target returns to the radio set. Several means have been devised for measuring and indicating range in miles or yards to the desired targets. Some systems have been developed that indicate the range to the target on a suitable scale or meter when a pip or range step is made to coincide with the target pip on the scope.

The chief disadvantage with the systems known to the prior art is that a separate range system is necessary, and this system often requires many circuit elements and adds greatly to the complexity, weight, and size of a radio set. In many applications, such as air-borne or portable operation, weight and size are extremely important factors in the design of a set. In other applications where trained personnel are not available for servicing sets, simplicity is an important factor.

It is an object of this invention, therefore, to present a simple, accurate circuit for measuring the range to a target. This circuit will use a minimum of circuit elements and will present the range data in a convenient usable form.

It is a further object of this invention to present a circuit for producing a gate to be applied to a range mark generator or similar device, a signal to be used in the unblanking of a cathode ray tube, a sweep voltage, and a range step, all of which signals will be synchronized by means of a transmitted pulse and will be derived from the whole or a portion of a sweep voltage generated in this circuit. In accordance with the present invention there is provided a signal generator means that is actuated by a suitable trigger. This signal generator produces a plurality of output voltages having a plurality of wave forms. One of these voltage outputs is fed to a step control circuit. This step control circuit determines the time after the input trigger that a pulse will occur in the output of the step control circuit. The output of the step control circuit is fed through suitable amplifiers to square up the output wave form of the step control circuit.

For a better understanding of the invention, together with other and further objects thereof, reference is had to the following description taken in connection with the accompanying drawings, and the scope of the invention will be pointed out in the appended claims.

In the accompanying drawings,

Fig. 1 is a block diagram of the invention and auxiliary circuits;

Fig. 1A is a view of the cathode ray tube screen; and

Fig. 2 is a schematic diagram of the invention.

Referring now more particularly to Fig. 1 of the drawings, there is shown in block diagram form the invention and associated circuits arranged so as to form a range indicating system.

A trigger 10 is fed to sweep generator 11; this trigger 10 is used to start the sweep generator 11, as will be explained later in connection with Fig. 2. The output of the sweep generator 11 is fed to a shutoff tube 12, and the output of shutoff tube 12 is fed to the cathode 13 of a cathode ray tube 14, to pulsed oscillator 15 and to sweep generator 11. The output of sweep generator 11, in addition to going to shutoff tube 12, is fed to direct current restorer 16, inverter 17, neutralizing network 18 and step control 20. The output of step control 20 is fed to step amplifier 21 as is the output of neutralizing network 18. The output of step amplifier 21 is fed through deflection amplifier 22 and thence to deflection plates 23 of cathode ray tube 14. The output of pulse oscillator 15 is coupled to pip generator 24. Oscillator 15 and generator 24 together make up a range mark generator. The range marks from pip generator 24 are fed to deflection amplifier 22 where they are mixed with the output of step amplifier 21 and the video signals from a receiver system. A second set of plates 26 in cathode ray tube 14 is fed from inverter 17 through direct current restorer 16. Step control 20 in this example is mechanically coupled to an optical sight 27. The optical sight is not a part of the electrical circuit of the invention, but it serves to illustrate a use of the invention. The use of this circuit with the optical sight will be referred to more fully in connection with the operation of the circuit.

Referring now to Fig. 2, there is shown schematically the circuits more directly related to the invention. The first stage of the circuit is made up of shutoff tube 30 with the associated plate load resistor 31 and a plate bias circuit made up of resistor 32 and capacitor 33 in parallel. A bias on cathode 34 of tube 30 is obtained by a voltage divider made up of resistors 36 and 37 connected in series between ground and a source of B+ potential. Cathode 34 is connected to the point 38 between the two resistors 36 and 37. A bypass capacitor 39 is connected from cathode 34 to ground so that cathode 34 is effectively at ground potential for alternating currents. Anode 41 of tube 30 is coupled to grid 42 of tube 43 by means of a network made up of resistor 44 in parallel with capacitor 46. A coupling capacitor 47 is also connected to grid 42 and serves as a means for applying a trigger 10 to grid 42.

The sweep generator circuit is made up of sweep generator tube 43, a diode 45, and a vacuum tube 50 connected as a cathode follower. The resistance-capacitance combination for producing the saw tooth voltage is made up of resistor 51 connected from cathode 52 of tube 45 to anode 53 of tube 43 and the series combination of capacitor 54 and resistor 56 connected between anode 53 of tube 43 and ground. The point 57 between capacitor 54 and resistor 56 is connected to grid 58 of tube 30, and anode 53 of tube 43 is connected to grid 59 of tube 50. Resistor 61 is connected between cathode 62 of tube 50 and ground and serves as a cathode load for tube 50. Anodes 63 of tube 50 and 64 of tube 45 are returned to a source of B+ potential. A coupling capacitor 66 connects cathode 52 of tube 45 and cathode 62 of tube 50. The circuit as described to this point will be referred to as a signal generator circuit.

The circuit of the block-marked step control 20 in Fig. 1 is made up of vacuum tube 67 and resistors 68, 69, and 75. Resistors 68 and 69 are connected in series between source of positive potential and ground and serve as a voltage divider. Resistor 75 is connected from cathode 76 of tube 67 to a movable tap 77 on resistor 69. The anode 70 of tube 67 is connected to cathode 62 of tube 50.

The output of the step control is coupled to a two stage step amplifier containing vacuum tubes 78 and 79. Resistor 81 is the plate load resistor for tube 78, and the parallel combination of resistor 82 and capacitor 83 form a cathode bias circuit to maintain cathode 84 of tube 78 at a positive potential with respect to ground. Grid 86 of tube 78 is coupled to cathode 76 of tube 67 by means of coupling capacitor 87 while grid leak resistor 88 is connected between grid 86 and ground. A coupling capacitor 89 connects anode 90 of tube 78 to a coupling network made up of resistors 95 and 96 and capacitor 97. Resistor 96 and capacitor 97 are connected in parallel between grid 98 of tube 79 and one end of capacitor 89. Resistor 95 is connected from this same end of capacitor 89 to a source of B+ potential. The second stage of amplification consists of tube 79 with its load resistor 99 connected between a source of B+ potential and anode 101. The cathode 102 of tube 79 is connected to ground. A neutralizing means comprising variable capacitor 103 is connected from cathode 62 of tube 50 to grid 98 of tube 79.

Means are provided for taking signals from this circuit at the following points:

The range step at anode 101 of tube 79.

The cathode ray tube sweep at cathode 62 of tube 50.

The gate for the range mark generator at anode 41 of tube 30, and

The unblanking gate for the cathode ray tube at point 104 between resistors 31 and 32.

The operation of this circuit is as follows. Tube 43 is normally conducting with the grid at or near cathode potential. Tube 30 may be conducting slightly or may be completely cut off and grid 58 is at a potential somewhat below that of cathode 34. A negative trigger is applied to grid 42 of tube 43 through coupling capacitor 47. This trigger is supplied at predetermined times and provides a reference time for the entire circuit. When this circuit is used with a radio pulse transmitter to measure distance, the trigger usually occurs at the same time as a pulse is sent out from the transmitter. This negative trigger cuts off tube 43, and anode 53 attempts to rise to B+ potential, but it is prevented from doing this by the fact that capacitor 54 cannot change charge instantaneously. A sudden rise in potential occurs at point 57 due to the initial charging current of capacitor 54 flowing through resistor 56. This rise in potential is transferred to grid 59 of tube 50 and anode 53 of tube 43 by capacitor 54. After this small initial rise, the potential of anode 53 starts to rise exponentially to B+ at a rate determined by the time constant of the resistance-capacitance circuit comprising tube 45, resistors 51 and 56 and capacitor 54. The sudden rise in potential at point 57 is applied to grid 58 of tube 30. This causes an increase in plate current in tube 30 which in turn causes the potential of anode 41 to drop. This drop is applied to grid 42 of tube 43 to keep this tube cutoff after the negative potential provided by the trigger is removed. The drop in potential at anode 41 is used also as a negative gate to be applied to the range mark generator to cause the generator to become operative. A second negative gate is taken from point 104 and applied to the cathode ray tube in the form of an unblanking pulse. This negative gate differs from the gate taken from anode 41 only by the direct current potential difference produced by the parallel combination of resistor 32 and capacitor 33. The signal on anode 53 of tube 43 is also applied to grid 59 of tube 50. The same wave form will be present at the cathode 62 of tube 50 as was present on the grid but will be reduced in amplitude by the gain of the cathode follower. This signal is applied to cathode 52 of tube 45 by means of coupling capacitor 66. Capacitor 54 continues to charge until the potential of cathode 52 of tube 45 reaches approximately the potential of anode 64. When this point is reached, tube 45 ceases to conduct, capacitor 54 stops charging; and therefore, no current will flow through resistor 56. Point 57 will be at ground potential; since there is no potential drop across resistor 56, this will cause a drop in plate current in tube 30 due to grid 58 dropping in potential. If the plate current drops in tube 30, the potential of anode 41 will rise which will mean that grid 42 of tube 43 will rise in potential. The rise in potential on grid 42 causes tube 43 to conduct causing the potential of anode 53 to fall. Capacitor 54 discharges rapidly through tube 43 so the potential of anode 53 will fall much more rapidly than it rises. Once tube 43 conducts, initial conditions are restored, and the cycle will be repeated the next time a negative trigger is applied to grid 42 of tube 43. The rate of rise and the time duration of the exponential voltage at anode 53 may be controlled by proper selection of circuit constants.

A voltage to produce a sweep on the cathode ray tube associated with this circuit may be taken from cathode 62 of tube 50. The output of cathode 62, which is essentially a trapezoidal wave, is also coupled to anode 70 of diode 67. The cathode 76 of tube 67 is maintained at a positive potential with respect to ground by means of a voltage divider made up of resistors 68 and 69. The potential of cathode 76 may be varied by varying tap 77 on resistor 69. No signal will be applied to grid 86 of tube 78 as long as anode 70 is at a lower potential than cathode 76. Since the signal on anode 70 is a trapezoidal wave, the bias on cathode 76 of tube 67 will determine the time that will elapse after the input trigger before a signal will be applied to grid 86 of tube 78. The signal that is applied to grid 86 is essentially a positive-going saw tooth wave. The signal is amplified in tube 78 and it is then applied to grid 98 of tube 79. The coupling circuit comprising capacitors 89 and 97 and resistors 95 and 96 is designed to maintain grid 98 at the proper direct current potential. The signal is amplified in tube 79 and the output to the cathode ray tube is taken from anode 101 of tube 79. Although the signal on grid 86 was a saw tooth, the slope of the output wave is nearly vertical due to the amplification of the two stages. The amplitude of the signal is limited by the point where grid 86 starts to go above cathode potential and where grid 98 of tube 79 goes below cutoff. The resulting output wave from anode 101 of the tube 79 is essentially a rectangular wave, the leading edge of said wave occurring at a time after the start of the sweep determined by the position of tap 77 on resistor 69. A small variable capacitor 103 is used to neutralize any signal appearing on grid 98 of tube 79 that has been coupled through to this grid by the interelectrode capacitance of tube 67. Capacitor 103 performs this neutralization by coupling a signal to grid 98 that is in phase opposition to any signal coupled to grid 98 by stray capacitance of tube 67. Capacitor 103 is adjusted for optimum performance of the circuit.

The tap 77 on resistor 69 may be mechanically coupled to a device to read range. This coupling is represented by the dotted line 106. When the step on the cathode ray tube screen is made to coincide with the target pip, the range measuring device can be made to read the range to the target directly; or if desired, the movement of tap 77 may be mechanically connected to a device, for example, a sight so that when the range step is made to follow a target pip, the range is set into the device automatically. This second application is illustrated in Fig. 1 of the drawings. Optical sight 27 is mechanically coupled to tap 77 of resistor 69 in Fig. 9. Fig. 1A shows a view of the screen of cathode ray tube 14. A pip 108 on time base 109 indicates the time a pulse of radio frequency energy is transmitted by the system, a second pip 110 indicates the time that an echo is received by the system. Range step 111 forms a depression in time base 109 as shown in Fig. 1A. As tap 77 is moved so as to keep the range step 111 in coincidence with the target pip 110, the range to the target is automatically set into the sight. The tap 77 on resistor 69 may be moved manually or may be positioned by suitable automatic range tracking circuit.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A signal generator circuit for producing a first group of voltage wave forms occurring in a fixed time relationship with a suitable synchronizing pulse and a second group of voltage wave forms occurring in a variable time relationship with said synchronizing pulse and for controlling and indicating the time relationship between said second group of wave forms and said synchronizing pulse; said circuit comprising a means for introducing a synchronizing pulse, signal generator means responsive to said synchronizing pulse, said generator means comprising an amplifier means, a sweep generator means, and a cathode follower means; a step control means, said step control means comprising a vacuum tube and a source of variable direct current potential; a step amplifier means comprising two stages of amplification; means for applying at least a portion of the output of said signal generator means to said step control means; means for applying at least a portion of the output of said step control means to said step amplifier means; a neutralizing means for applying at least a portion of the output of said signal generator means to at least one stage of said step amplifier means; and means associated with said source of variable direct current potential for indicating time relationship between the output of said step amplifier and said synchronizing pulse.

2. A signal generator circuit for producing a first group of voltage wave forms occurring in a fixed time relationship with a suitable synchronizing pulse and a second group of voltage wave forms occurring in a variable time relationship with said synchronizing pulse; and for controlling and indicating the time relationship between said second group of wave forms and said synchronizing pulse, said circuit comprising a means for introducing a synchronizing pulse; a signal generator means responsive to said synchronizing pulse; a step control means comprising a vacuum tube and a source of variable direct current potential; means for applying a portion of the output of said signal generator means to said step control means; means associated with said source of variable direct current potential calibrated to indicate the time relationship between the output of said step control circuit and said synchronizing pulse; an amplifier means, and means for applying at least a portion of the output of said step control means to said amplifier means.

3. A signal generator means for producing a plurality of voltage pulses, the start of said voltage pulses being determined by a synchronizing pulse and the end of said voltage pulses being determined by voltage relationships within said signal generator means, said circuit comprising a means for introducing a synchronizing pulse, a trapezoidal generator means responsive to said synchronizing pulse, an amplifier means, a cathode follower means, means for applying at least a portion of the output of said trapezoidal generator means to said amplifier means and said cathode follower means, means for applying at least a portion of the output of said amplifier means to said trapezoidal generator means, and means for applying at least a portion of the output of said cathode follower means to said trapezoidal generator means, said last mentioned means comprising a capacitor and a vacuum tube.

4. A signal generator circuit for producing a plurality of wave forms occurring in a fixed time relationship with a synchronizing pulse, said circuit comprising a means for introducing a synchronizing pulse, a trapezoidal generator means responsive to said synchronizing pulse, an amplifier means, a cathode follower means, means for applying at least a portion of the output of said trapezoidal generator means to said amplifier means and said cathode follower means, means for applying at least a portion of the output of said amplifier means to said trapezoidal generator means, and means for applying at least a portion of the output of said cathode follower means to said trapezoidal generator means.

EDWARD F. MacNICHOL, JR.

REFERENCES CITED

The following references are of record in the file of this patent:

UNITED STATES PATENTS

| Number | Name | Date |
|---|---|---|
| 2,373,145 | Sensiper et al. | Apr. 10, 1945 |
| 2,471,408 | Busignies | May 31, 1949 |
| 2,477,615 | Isbister | Aug. 2, 1949 |
| 2,534,862 | Fox | Dec. 19, 1950 |
| 2,542,032 | Isbister et al. | Feb. 20, 1951 |